(12) United States Patent
Jung

(10) Patent No.: US 11,926,116 B2
(45) Date of Patent: Mar. 12, 2024

(54) METHOD FOR MANUFACTURING SHOES HAVING RESILIENT MEMBERS EMBEDDED THEREIN

(71) Applicant: Young Suk Jung, Seoul (KR)

(72) Inventor: Young Suk Jung, Seoul (KR)

( * ) Notice: Subject to any disclaimer, the term of this patent is extended or adjusted under 35 U.S.C. 154(b) by 385 days.

(21) Appl. No.: 17/430,703

(22) PCT Filed: Feb. 11, 2020

(86) PCT No.: PCT/KR2020/001858
§ 371 (c)(1),
(2) Date: Aug. 12, 2021

(87) PCT Pub. No.: WO2020/166919
PCT Pub. Date: Aug. 20, 2020

(65) Prior Publication Data
US 2022/0194039 A1 Jun. 23, 2022

(30) Foreign Application Priority Data
Feb. 13, 2019 (KR) ......................... 10-2019-0016680

(51) Int. Cl.
*A43D 3/02* (2006.01)
*A43B 13/18* (2006.01)
*B29D 35/00* (2010.01)
*B29D 35/14* (2010.01)

(52) U.S. Cl.
CPC .......... *B29D 35/142* (2013.01); *A43B 13/182* (2013.01); *A43B 13/185* (2013.01); *A43D 3/02* (2013.01); *B29D 35/0009* (2013.01); *B29D 35/0054* (2013.01)

(58) Field of Classification Search
CPC ... A43B 13/182; A43B 13/183; A43B 13/185; A43D 3/02; B29D 35/122; B29D 35/0054
USPC ...................... 36/28; 12/133 R, 133 B, 142 R
See application file for complete search history.

(56) References Cited

U.S. PATENT DOCUMENTS

| 291,991 | A | * | 1/1884 | Day | ......................... | A43D 3/02 |
| | | | | | | 12/133 R |
| 1,121,236 | A | * | 12/1914 | Dunbar | ..................... | A43D 3/02 |
| | | | | | | 12/133 R |
| 1,870,114 | A | * | 8/1932 | Heller | .................. | A43B 13/182 |
| | | | | | | 36/3 R |
| 2,216,159 | A | * | 10/1940 | Cuozzo | ..................... | A43D 3/02 |
| | | | | | | 12/142 F |
| 2004/0154191 | A1 | * | 8/2004 | Park | ...................... | A43B 13/182 |
| | | | | | | 36/27 |
| 2009/0119949 | A1 | * | 5/2009 | Song | .................... | A43B 13/182 |
| | | | | | | 36/35 B |
| 2010/0058616 | A1 | * | 3/2010 | Ryoo | .................. | A43B 13/187 |
| | | | | | | 36/102 |

(Continued)

FOREIGN PATENT DOCUMENTS

| KR | 10-0509518 B1 | 8/2005 |
| KR | 10-0518307 B1 | 9/2005 |

(Continued)

*Primary Examiner* — Marie D Bays
(74) *Attorney, Agent, or Firm* — Maschoff Brennan

(57) ABSTRACT

The present invention provides a method for manufacturing shoes having springs embedded therein, the method in which comfort and body weight distribution effect can be enhanced by means of the shock-absorbing force of resilient members being more effectively transmitted to the soles of a wearer.

4 Claims, 6 Drawing Sheets

(56) References Cited

U.S. PATENT DOCUMENTS

2019/0008237 A1\* 1/2019 Wang ................. B29D 35/0063
2020/0031072 A1\* 1/2020 Leslie ...................... A43D 9/00
2020/0085140 A1\* 3/2020 Hurd ................... B29D 35/142

FOREIGN PATENT DOCUMENTS

| KR | 10-1278647 B1 | 6/2013 |
| KR | 10-2017-0019952 A | 2/2017 |
| KR | 10-1760432 B1 | 7/2017 |
| KR | 10-2010241 B1 | 8/2019 |

\* cited by examiner

METHOD FOR MANUFACTURING SHOES HAVING RESILIENT MEMBERS EMBEDDED THEREIN

FIELD OF INVENTION

The present invention relates to a method of manufacturing a shoe having an elastic member installed therein, and more particularly to a method of manufacturing a shoe having an elastic member installed therein for achieving comfortable fit and improving an effect of distributing load of the body in order to more effectively transfer cushioning power of a spring to the sole of the foot of a wearer.

BACKGROUND OF INVENTION

In general, shoes are worn on people's feet in order to protect the feet to which the greatest load is applied in the human body and to achieve comfortable fit of the feet and shoes have various functions and structures for elastically supporting or distributing the load of the body.

As proposed in the prior art, in order to distribute the load of the body, an air chamber is formed or an air bag is provided in a rear part of an insole of a shoe to provide cushioning power, and a spring is combined with a bottom surface or a rear part of the insole of the shoe to relieve the load on the body.

Recently, many spring shoes having a spring on a bottom surface of the shoe have been proposed for the purpose of diet or correcting body balance by maximizing cushioning power of the shoe.

The spring shoe has a spring attached to the bottom of the shoe, and has been applied as a shoe that absorbs shock by spring elasticity and provides lots of momentum. Accordingly, if a user repeats the same movement for the same time period, he or she is capable of gaining more momentum than when wearing general sneakers, and thus recently, shoes have been very popular for basic exercise and injury prevention from adults who lack exercise time.

Accordingly, recently, a spring shoe with a spring on the bottom of the shoe has been variously proposed through various ideas, but most shoes are configured and used by arranging a plurality of springs at the bottom of the shoe or by installing a single spring on the bottom of a rear part of the shoe.

However, in the former case in which a plurality of springs are arranged, the spring shoe is only used for exercise purposes, and there is a problem that it is difficult to perform a function of a general shoe in normal times. In the latter case of using a single spring, there is a problem in that it is possible to maintain balance during walking only when the heel of a shoe wearer is positioned at the upper center of the spring, and a stable buffering effect is not achieved during walking if the load even slightly deviates from the center.

In general, a spring installed in a shoe is generally positioned on an upper surface of a shoe sole because when the load of the body is transferred to the spring during walking, the shoe sole with cushioning power contracts and the spring is lowered to absorb the cushioning power of the spring, and as a result, there is a disadvantage that it is impossible to achieve a cushioning effect of the shoes desired by a wearer.

SUMMARY OF INVENTION

Technical Problem to be Solved

Accordingly, an object of the present invention for overcoming the aforementioned problem is to provide a method of manufacturing a shoe having an elastic member installed therein for achieving comfortable fit and improving an effect of distributing load of the body in order to more effectively transfer cushioning power of a spring to the sole of the foot of a wearer.

Technical Solution

To achieve the aforementioned objects, the present invention provides a method of manufacturing a shoe having a spring installed therein, including a sole molding operation of molding a sole with a shape corresponding to a foot sole of a wearer, having an upper surface on which a groove is recessed, after a foam material is injected into a mold, a plate insertion operation of inserting a plate formed of a rigid material into the groove recessed on the upper surface of the sole, an elastic member installation operation of placing an elastic member for providing cushioning power to an upper surface of the plate, a cover installation operation of covering the spring placed on the plate by the cover, an upper compression molding operation of inserting a last into an upper molded to provide an accommodation portion with a shape corresponding to a shape of the foot of the wearer, having a bottom surface for accommodating the spring and a cover and then compressing, with a press, the upper into which the last is inserted to the upper surface of the sole in a state in close contact with the upper surface of the sole, to mold a shoe including the upper and the sole, and an insole insertion operation of inserting an insole that comes into direct contact with the foot of the wearer into an inner bottom surface of the upper.

The elastic member may be a spring, at least one groove may be provided on the upper surface of the plate, and the spring may be inserted into the groove.

The elastic member may include upper and lower nonwoven fabrics and a spring inserted into a partition space formed between the upper and lower nonwoven fabrics.

A groove for inserting the accommodation portion of the upper thereinto may be formed on a bottom surface of the last.

Effect of Invention

According to the present invention, a groove may be formed on an upper surface of a sole, and then a plate formed of a rigid material may be installed in the groove to support an elastic member on the plate, and thus, when load of the body is transferred to the elastic member, the plate may support the elastic member to more effectively transfer cushioning power of the elastic member to a wearer, thereby improving a buffering effect of a shoe.

In addition, the elastic member may be installed to protrude from an upper surface of the sole, and thus may more actively respond to pressure of the foot of the wearer, thereby maximizing cushioning power of the shoe.

BEST MODE

Hereinafter, an embodiment of the present invention will be described with reference to the accompanying drawings. In the detailed description to be described later, various embodiments of the present invention will be presented in order to overcome the aforementioned technical problem. In addition, other embodiments of the present invention are replaced by the description in the configuration of the present invention.

Figure 1:
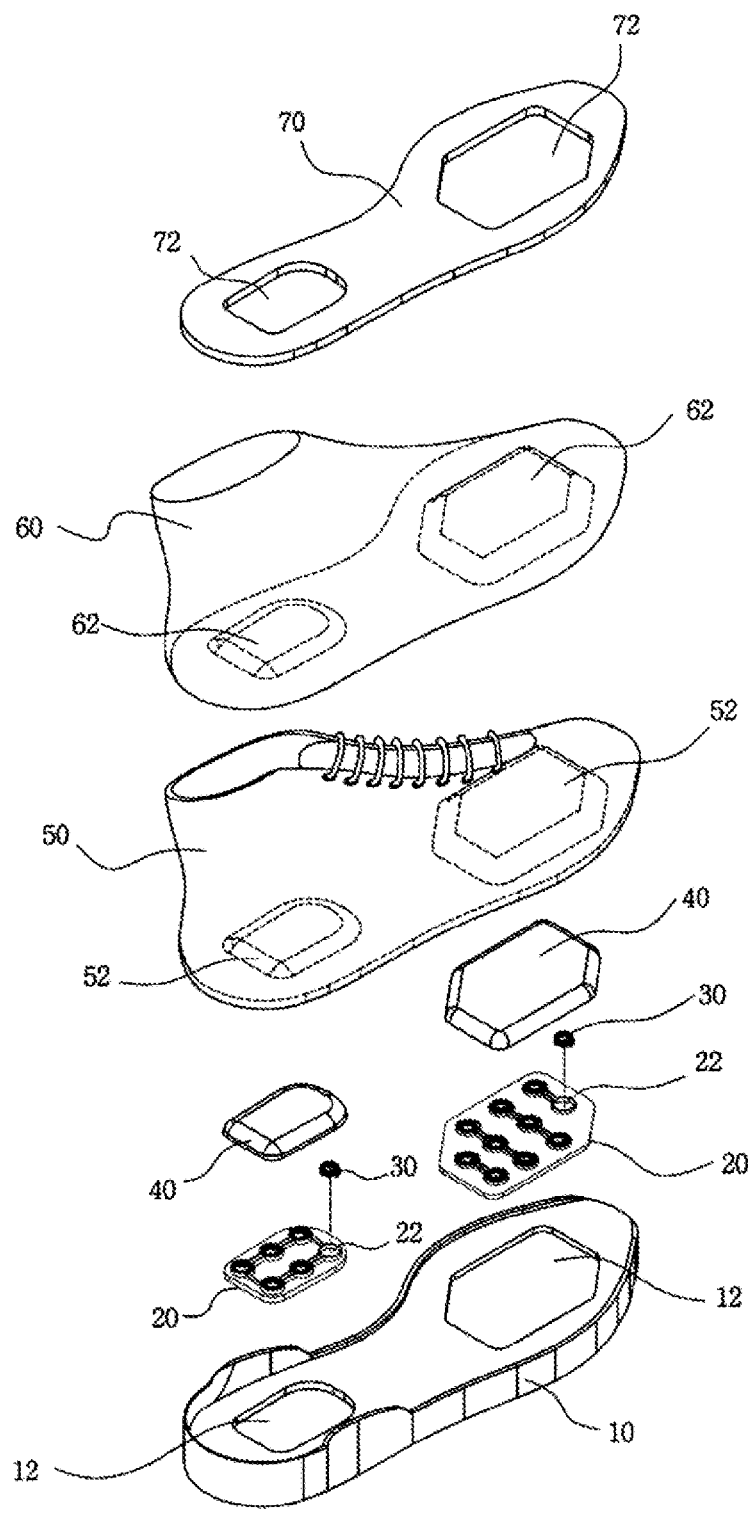
FIG. 1 is an exploded diagram showing the configuration of a shoe having a spring installed therein according to the present invention.
Figure 2:
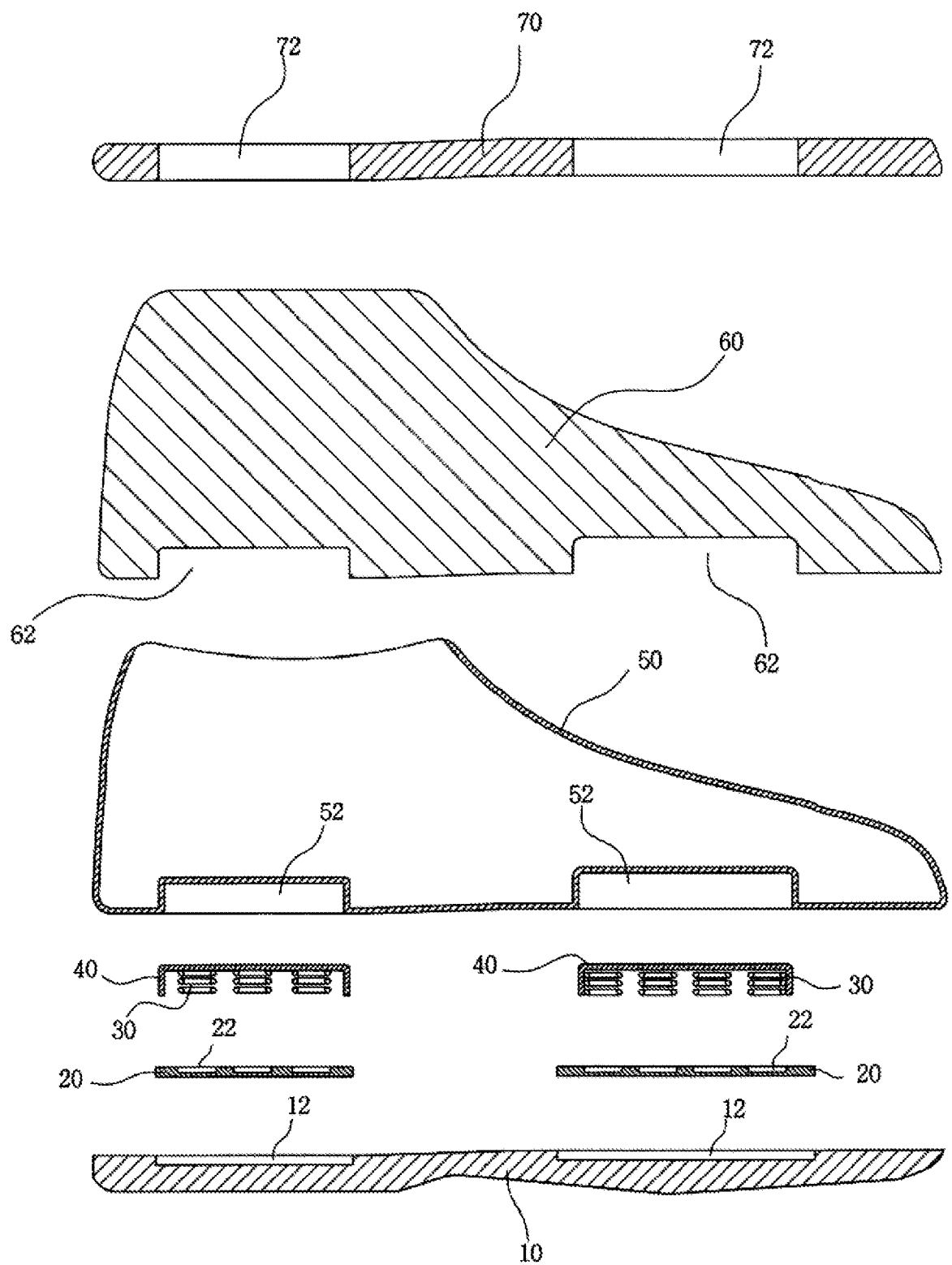
FIG. 2 is a cross-sectional view of FIG. 1.

FIG. 1 is an exploded diagram showing the overall configuration of a shoe having a spring installed therein according to an exemplary embodiment of the present invention. FIG. 2 is a cross-sectional view of FIG. 1.

As shown in FIGS. 1 and 2, a shoe 100 having a spring installed therein according to the present invention may broadly include a sole 10, plates 20, elastic members 30, covers 40, an upper 50, and a liner 70.

The sole 10 may be a member for alleviating shock transmitted to the sole of the foot of a wearer during walking and may be molded into a shape corresponding to the sole of the foot of the wearer by injecting a foam material into a mold having a shape corresponding to the sole of the foot and then applying predetermined heat and pressure. In this case, at least one groove may be formed on an upper surface of the sole 10, and according to the present invention, two grooves 12 may be recessed to a predetermined depth on the upper surface of the sole 10.

The elastic members 30 for providing the cushioning power of the sole 10 and relieving the load of a wearer may be installed on the upper surface of the sole 10, and in this regard, the elastic members 30 need to contract and exert cushioning power when the load of the foot is applied to the elastic members 30 during walking, but as described above, the sole 10 for supporting the elastic members 30 is not capable of supporting the elastic members 30 and contracts because the sole 10 is foamed with a foam material, and the elastic members 30 absorb cushioning power to reduce a cushioning effect of the elastic members 30, and accordingly, in order to achieve a cushioning effect desired by the wearer, a hard material for supporting the elastic members 30 needs to be inserted between the elastic members 30 and the sole 10.

To this end, according to the present invention, when the sole 10 is foamed, the grooves 12 may be formed on the upper surface of the sole 10, the plates 20 formed of a rigid material may be inserted into the grooves 12, and then springs may be inserted one by one into spring grooves formed on upper surfaces of the plates 20 to effectively exert the cushioning power of the spring. The elastic members 30 according to the present invention may include springs, and the springs may be inserted into grooves 22 formed on the upper surfaces of the plates 20, respectively, to exert elastic force.

The covers 40 may cover the elastic members 30 installed on the upper surface of the sole 10 to prevent the elastic members 30 from being separated and may achieve a load distribution effect of evenly transmitting the load of the sole of the foot to all of the elastic members 30.

As described above, when the elastic members 30 are positioned on the upper surface of the sole 10 and is covered by the covers 40, the elastic members 30 and the covers 40 may protrude by a predetermined height from the upper surface of the sole 10. Through the protruding height of the elastic members 30, the sole of the foot of the wearer may more effectively reach the elastic members 30 during walking, thereby achieving stable cushioning power.

The upper 50 may be a member that is molded into a shape corresponding to the foot of the wearer and surrounds the foot of the wearer, and a finished shoe in which the upper 50 and the sole 10 are integrated may be formed by putting the upper 50 on the upper surface of the sole 10 in the state in which the upper 50 is worn on a last 60 and then compressing the resulting structure with a press.

In this case, accommodation portions 52 having grooves corresponding to the protruding height of the elastic members 30 and the covers 40 that protrude from the sole 10 may be provided on a bottom surface of the upper 50, and insertion grooves 62 for inserting the accommodation portions 52 of the upper 50 may be recessed on a bottom surface of the last 60 inserted into the upper 50 in order to compress and mold the upper 50 to the sole. When the upper 50 is compressed and molded to the upper surface of the sole 10 through the accommodation portions 52 of the upper 50 and the insertion grooves 62 of the last 60, the upper 50 may be compressed and molded to the sole 10 without interference from the elastic members 30 and the covers 40 that protrude from the upper surface of the sole 10.

After the upper 50 and the sole 10 are completely compressed, the last 60 is separated from the upper 50

The liner 70 may be inserted into an inner bottom surface of the upper 50 compressed to the upper surface of the sole 10 to directly contact the sole of the foot of the wearer and provide cushioning power.

Holes 72 may be formed through the liner 70 at positions corresponding to the accommodation portions 52 of the upper 50, and after the liner 70 is aligned with the bottom surface of the upper 50, the accommodation portions 52 may be inserted into the holes 72. By drilling the holes 72 in the liner 70, the accommodation portions 52 of the upper 50 may not protrude from the bottom surface of the upper 50 and may be placed on the same line horizontally with the liner 70, and thus the wearer may achieve comfortable fit during walking and may simultaneously experience the cushioning effect of the elastic members 30.

Figure 3:
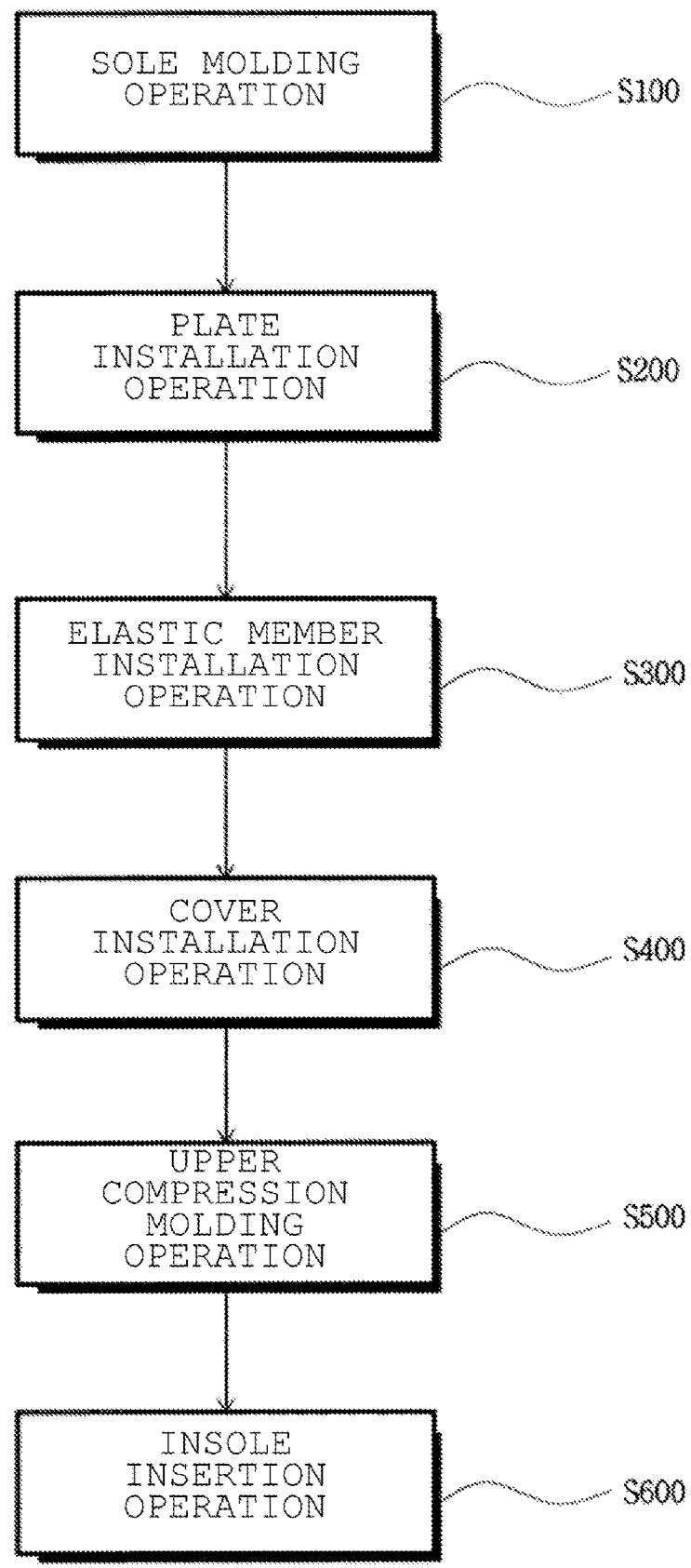
FIG. 3 is a flowchart showing a method of manufacturing a shoe having a spring installed therein according to the present invention.
Figure 4A:
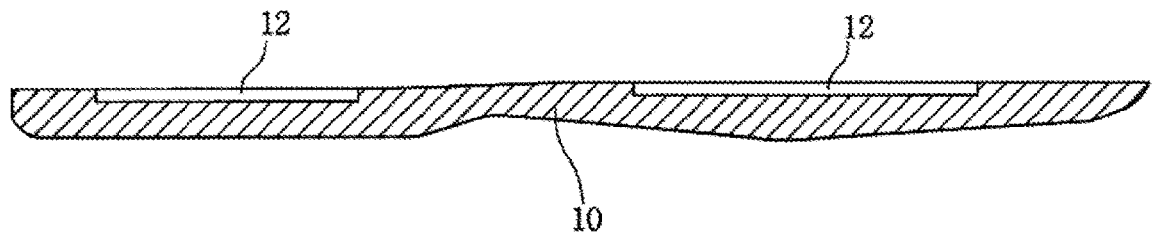
FIGS. 4A to 4E are diagrams showing configurations for respective operations of a method of manufacturing a shoe having a spring installed therein.
Figure 4B:
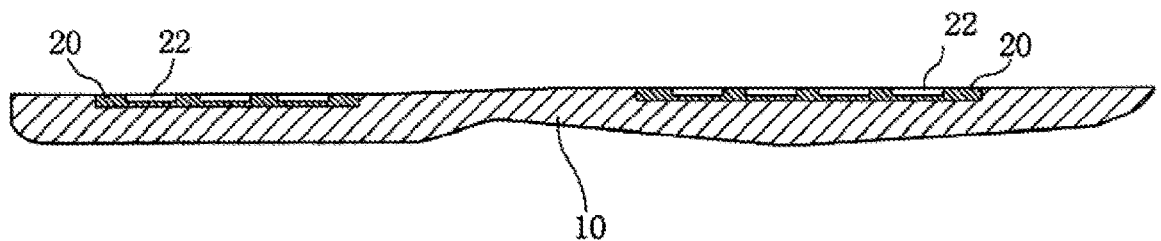
Figure 4C:
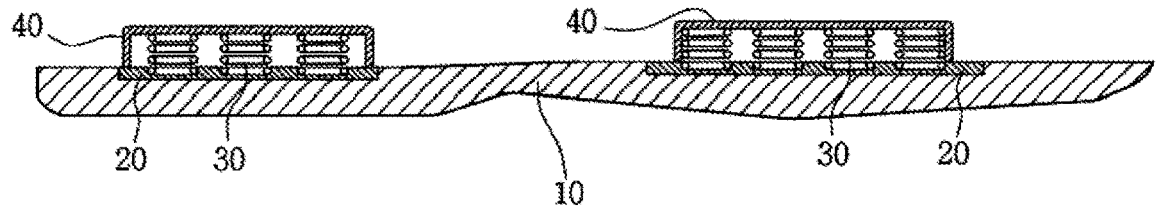
Figure 4D:
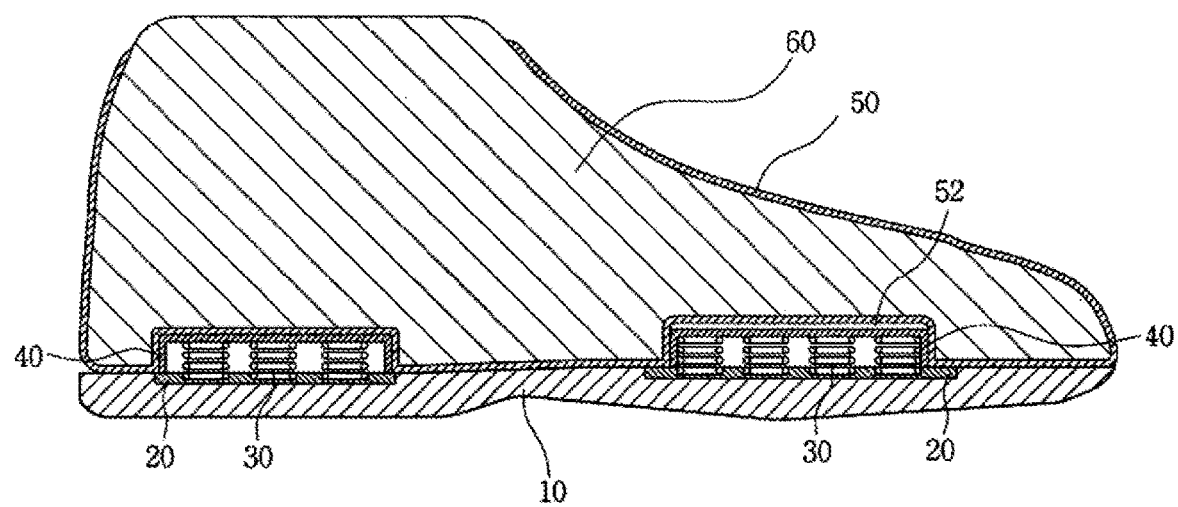
Figure 4E:
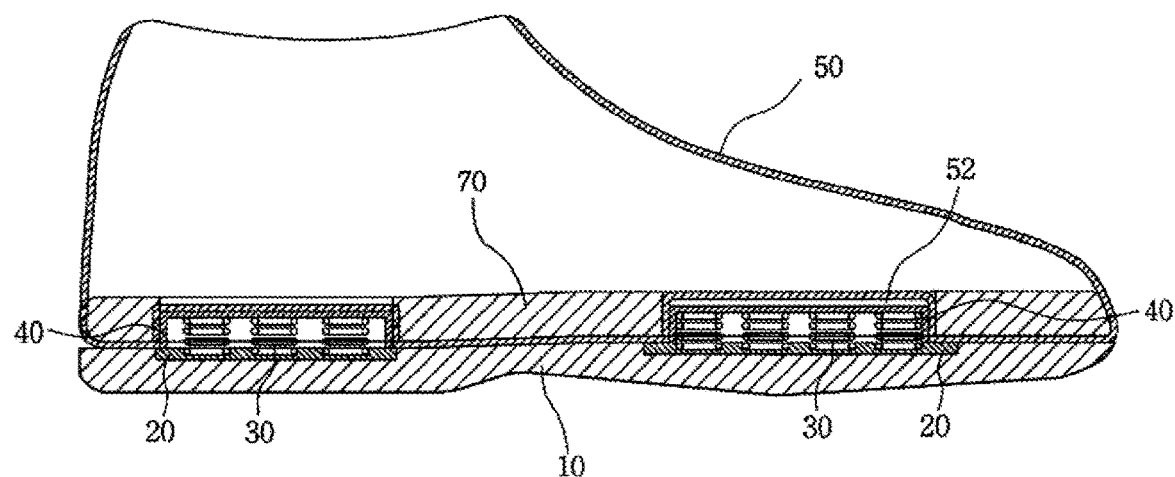

Hereinafter, a method of manufacturing a shoe having a spring installed therein according to the present invention as configured above will be described with reference to FIGS. 3 to 4E.

As shown in the drawings, the method of manufacturing a shoe having a spring installed therein according to the present invention may broadly include a sole molding operation S100, a plate installation operation S200, an elastic member installation operation S300, a cover installation operation S400, an upper compression molding operation S500, and an insole insertion operation S600.

In the sole molding operation S100, a foam material may be injected into a mold, and then predetermined heat and pressure may be applied to the resulting structure to mold the sole 10 having a shape corresponding to the sole of the foot of the wearer, and in this case, a core may be formed inside the mold, and the grooves 12 may be recessed in the upper surface of the foamed sole 10.

The plate installation operation S200 may be an operation of inserting the plates 20 into the grooves 12 that are formed on the upper surface of the sole through the sole molding operation S100 as a previous operation. In this case, the plates 20 may be formed of a hard plastic material to have a predetermined strength and may be injection-molded into a shape corresponding to the grooves 12. When the plates are inserted into the grooves 12 of the sole 10, the thickness of the plates 20 and the depth of the grooves 12 are equal to each other, and accordingly, when the plates 20 are inserted into the grooves 12 of the sole 10, the upper surface of the sole 10 may be placed on the same line horizontally with the plates 20. When the plates 20 are inserted into the grooves 12 of the sole 10, the plates 20 may be prevented from shifting using an adhesive.

The elastic member installation operation S300 may be an operation of inserting the elastic members 30 one by one into the grooves 22 formed on the upper surfaces of the plates 20 to achieve cushioning power of a shoe. In this case, when the load on the foot is transferred to the springs during walking, the plates 20 may support the elastic members 30 to prevent the sole 10 from absorbing cushioning power of the elastic members 30, thereby achieving a cushioning effect desired by the wearer.

The cover installation operation S400 may be an operation of covering the elastic members 30 inserted into the grooves 22 installed in the plates 20 by the covers 40, and in this regard, when the load of the foot is transferred to the elastic members 30 during walking, the covers 40 may prevent the elastic members 30 from being separated.

The elastic members 30 and the covers 40 may protrude by their own thickness from the upper surface of the sole 10 through the cover installation operation S400, and in this regard, cushioning power of the elastic members 30 may be intensively transferred when the wearer walks while wearing the shoe due to protrusion of the elastic members 30 and the covers 40.

The upper compression molding operation S500 may be an operation of compressing and molding the upper 50 to the upper surface of the sole 10 through the cover installation operation S400. The upper 50 may be molded to provide the accommodation portions 52 on the bottom surface of the upper 50. When the upper 50 is compressed and molded to the upper surface of the sole 10, the accommodation portions 52 may accommodate the elastic members 30 and the covers 40 that protrude from the upper surface of the sole 10 to prevent interference by the elastic members 30 and the covers 40 when the upper 50 is compressed.

A shoe in which the upper 50 and the sole 10 are integrated may be manufactured using a method of compressing the upper 50 to the sole 10 by inserting the last 60 into the upper 50, putting the upper 50 into which the last 60 is inserted on the sole 10, and then, compressing the resulting structure with a press. In this case, the insertion grooves 62 may also be formed on the bottom surface of the last 60, and when the last 60 is inserted into the upper 50, the accommodation portions 52 of the upper 50 may be inserted into the insertion grooves 62, and the upper 50 may be easily adhered to the upper surface of the sole 10 and may be compressed and molded.

The insole insertion operation S600 may be an operation of molding a finished shoe through the upper compression molding operation S500 as a previous operation and then inserting the liner 70, which comes into direct contact with the foot of a pedestrian, into the upper 50 of the shoe.

In this case, the holes 72 may be formed through the liner 70, and the accommodation portions 52 of the upper 50 may be inserted into the holes 72, thereby preventing the liner 70 from lifting off the bottom surface of the upper 50. After the liner 70 is aligned with the bottom surface of the upper 50, the upper surface of the liner 70 may be placed on the same line horizontally with the accommodation portions 52 of the upper 50, thereby preventing the fit from being degraded due to protrusion of the accommodation portions 52 during walking.

Although the case in which the holes 72 are formed through the liner 70 has been described as a representative example according to the embodiment of the present invention, the case may be replaced with the case in which a groove instead of a hole is recessed on the bottom surface of the liner 70.

Figure 5:
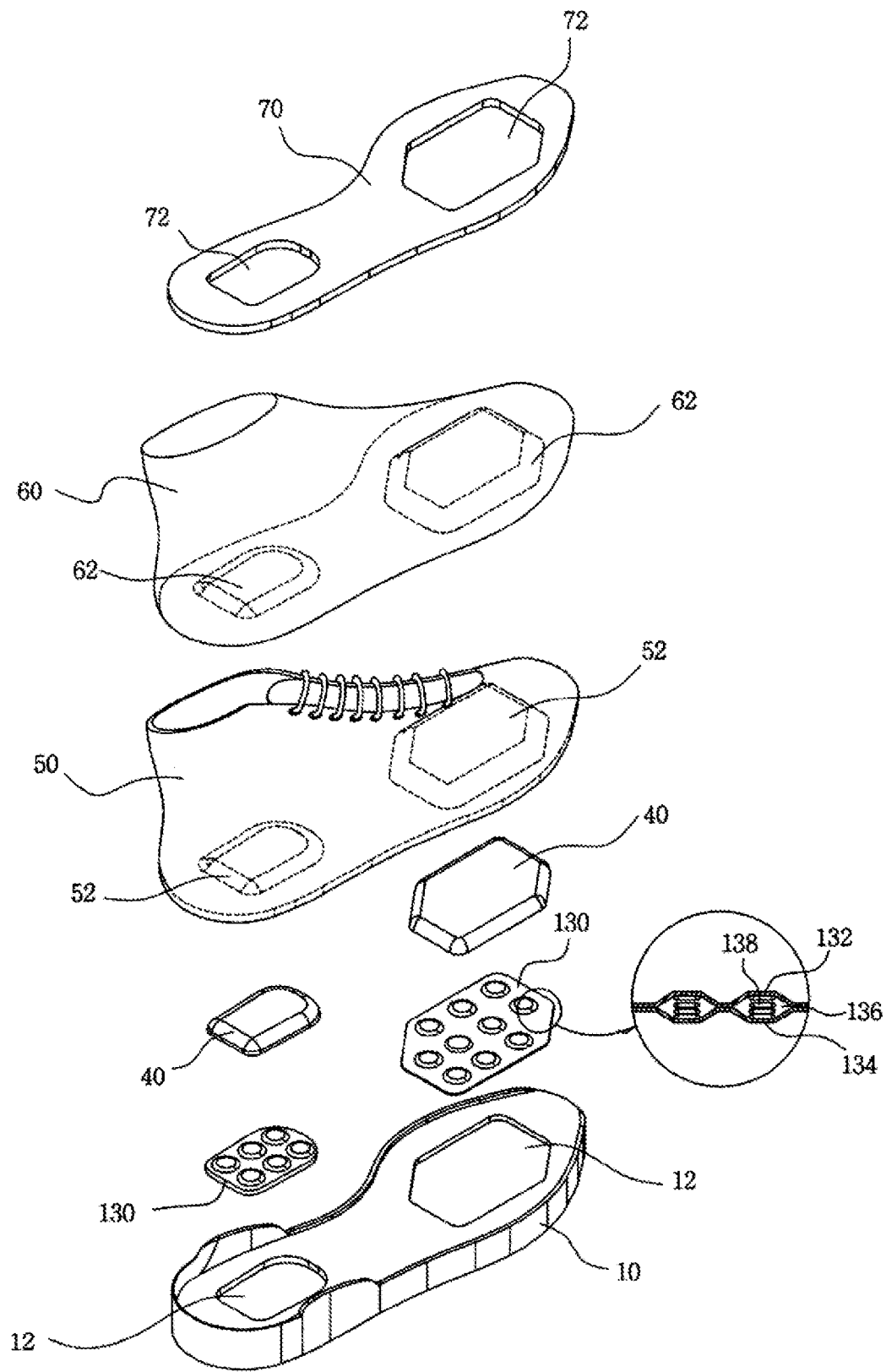
FIG. 5 is an exploded diagram showing the configuration of a shoe having a spring installed therein according to the present invention.

FIG. 5 is an exploded diagram showing the configuration of a shoe having a spring installed therein according to another embodiment of the present invention.

As shown in FIG. 5, the shoe 100 having a spring installed therein according to another embodiment of the present invention may include the sole 10, the plates 20, elastic members 130, the covers 40, the upper 50, and the liner 70 like in the aforementioned embodiment, and in this case, the elastic members 130 placed on the plates 20 may be configured by inserting single springs one by one according to the need and purpose like in the aforementioned embodiment, or one packaged (pocketlike) elastic member 130 may be configured by upper and lower nonwoven fabrics 132 and 134 and springs 138 inserted into a partition space 136 formed between the upper and lower nonwoven fabrics 132 and 134. In other words, when the elastic members 130 in the form of a package (pocket) are used, it is not necessary to insert springs one by one during assembly, thereby increasing work productivity based on assembly, which is applied differently depending on the need and purpose.

The invention claimed is:

1. A method of manufacturing a shoe having a spring installed therein, the method comprising:
    a sole molding operation of molding a sole with a shape corresponding to a foot sole of a wearer, having an upper surface on which a groove is recessed, after a foam material is injected into a mold;
    a plate insertion operation of inserting a plate formed of a rigid material into the groove recessed on the upper surface of the sole;
    an elastic member installation operation of placing an elastic member for providing cushioning power to an upper surface of the plate;
    a cover installation operation of covering the spring placed on the plate by the cover;
    an upper compression molding operation of inserting a last into an upper molded to provide an accommodation portion with a shape corresponding to a shape of the foot of the wearer, having a bottom surface for accommodating the spring and a cover and then compressing, with a press, the upper into which the last is inserted to the upper surface of the sole in a state in close contact with the upper surface of the sole, to mold a shoe including the upper and the sole; and
    an insole insertion operation of inserting an insole that comes into direct contact with the foot of the wearer into an inner bottom surface of the upper.

2. The method according to claim 1, wherein the elastic member is a spring, at least one groove is provided on the upper surface of the plate, and the spring is inserted into the groove.

3. The method according to claim 1, wherein the elastic member includes upper and lower nonwoven fabrics and a spring inserted into a partition space formed between the upper and lower nonwoven fabrics.

4. The method according to claim 1, wherein a groove for inserting the accommodation portion of the upper thereinto is formed on a bottom surface of the last.

\* \* \* \* \*